(12) United States Patent
Resconi et al.

(10) Patent No.: US 10,364,307 B2
(45) Date of Patent: Jul. 30, 2019

(54) PROCESS FOR PRODUCING PROPYLENE COPOLYMERS IN GAS PHASE

(71) Applicant: BOREALIS AG, Vienna (AT)

(72) Inventors: Luigi Resconi, Ferrara (IT); Norbert Hafner, Linz (AT); Wilfried Töltsch, Marchtrenk (AT)

(73) Assignee: Borealis AG, Vienna (AT)

( * ) Notice: Subject to any disclaimer, the term of this patent is extended or adjusted under 35 U.S.C. 154(b) by 27 days.

(21) Appl. No.: 15/510,030

(22) PCT Filed: Sep. 11, 2015

(86) PCT No.: PCT/EP2015/070889
§ 371 (c)(1),
(2) Date: Mar. 9, 2017

(87) PCT Pub. No.: WO2016/038210
PCT Pub. Date: Mar. 17, 2016

(65) Prior Publication Data
US 2017/0247484 A1 Aug. 31, 2017

(30) Foreign Application Priority Data
Sep. 12, 2014 (EP) .................................. 14184641

(51) Int. Cl.
| C08L 23/16 | (2006.01) |
| C08L 23/14 | (2006.01) |
| C08F 210/06 | (2006.01) |
| C08F 4/6592 | (2006.01) |
| C08F 2/38 | (2006.01) |
| C08F 4/659 | (2006.01) |

(52) U.S. Cl.
CPC .............. *C08F 210/06* (2013.01); *C08F 2/38* (2013.01); *C08L 23/14* (2013.01); *C08L 23/16* (2013.01);
(Continued)

(58) Field of Classification Search
CPC .......................... C08F 4/65927; C08F 4/65912; C08F 210/06; C08F 210/02; C08F 210/16; C08L 23/14
See application file for complete search history.

(56) References Cited

U.S. PATENT DOCUMENTS

| 5,753,773 A | 5/1998 | Langhauser et al. |
| 7,834,205 B2 | 11/2010 | Resconi et al. |

(Continued)

FOREIGN PATENT DOCUMENTS

| EP | 0703932 | 3/1996 |
| EP | 1448578 | 8/2004 |

(Continued)

OTHER PUBLICATIONS

Elder et al., "Synthesis and performance of ansa-metallocene catalysts with substituted heterocyclic and indenyl ligands," Kinetics and Catalysts, 2006, 47:192-197.
(Continued)

*Primary Examiner* — Caixia Lu
(74) *Attorney, Agent, or Firm* — Gardner Groff Greenwald & Villanueva, PC

(57) ABSTRACT

A process for the preparation of a heterophasic copolymer of propylene and ethylene comprising polymerizing propylene and ethylene in the gas phase in the presence of a solid particulate catalyst free from an external carrier comprising: (i) a symmetrical complex of formula (I), wherein M is zirconium or hafnium; each X is a sigma ligand; L is a divalent bridge selected from —R'$_2$C—, —R'$_2$C—CR'$_2$-, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl; $R^2$ is a C1-C20 hydrocarbyl radical; $R^5$ is a C1-C20 hydrocarbyl radical; $R^6$ is a tertiary C4-C20 hydrocarbyl radical; $R^7$ is a hydrogen atom or a $C_{1-10}$-hydrocarbyl radical; n is 0 to 3; $R^1$ is a C1-C20 hydrocarbyl radical and optionally two adjacent $R^1$ groups taken together can form a further mono or multicyclic ring condensed to Ph ring optionally substituted by one or two groups $R^4$; and $R^4$ is a C1-C10 alkyl radical and (ii) a cocatalyst, preferably comprising an organometallic compound of a Group 13 metal; wherein the xylene soluble fraction (XS) of the heterophasic copolymer of propylene and ethylene has an intrinsic viscosity of at least 1.5 dl/g and an ethylene content of 10 to 70 wt %.

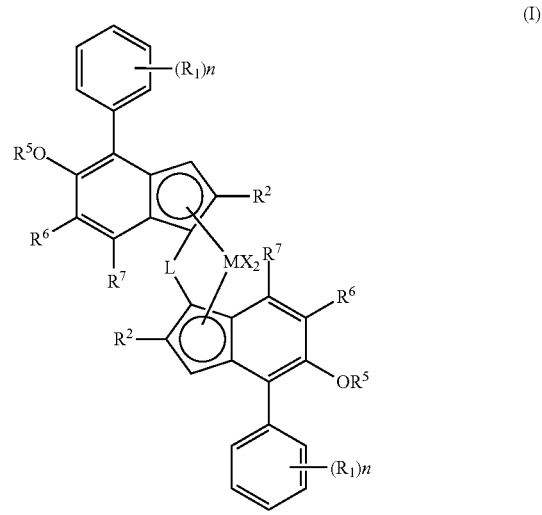

(I)

13 Claims, No Drawings

(52) U.S. Cl.
CPC ...... *C08F 4/65912* (2013.01); *C08F 2410/01* (2013.01)

(56) References Cited

U.S. PATENT DOCUMENTS

| | | | |
|---|---|---|---|
| 8,426,520 | B2 | 4/2013 | Nenseth et al. |
| 2013/0197153 | A1 | 8/2013 | Kheirandish et al. |

FOREIGN PATENT DOCUMENTS

| | | |
|---|---|---|
| EP | 1511803 | 9/2007 |
| EP | 2053086 | 4/2009 |
| EP | 2072546 | 6/2009 |
| EP | 2824142 | 1/2015 |
| EP | 2829558 | 1/2015 |
| WO | 2003051934 | 6/2003 |
| WO | 2004106351 | 12/2004 |
| WO | 2005058916 | 6/2005 |
| WO | 2005105863 | 11/2005 |
| WO | 2006097497 | 9/2006 |
| WO | 2007116034 | 10/2007 |
| WO | 2009054832 | 4/2009 |
| WO | 2009077032 | 6/2009 |
| WO | 2009077034 | 6/2009 |
| WO | 2010052260 | 5/2010 |
| WO | 2010052263 | 5/2010 |
| WO | 2010052264 | 5/2010 |
| WO | 2011050926 | 5/2011 |
| WO | 2011050963 | 5/2011 |
| WO | 2011076618 | 6/2011 |
| WO | 2011135004 | 11/2011 |
| WO | 2011135005 | 11/2011 |
| WO | 2012028252 | 3/2012 |
| WO | 2012084961 | 6/2012 |
| WO | 2013007650 | 1/2013 |
| WO | 2013007664 | 1/2013 |
| WO | 2016038211 | 3/2016 |

OTHER PUBLICATIONS

Nifant'Ev et al., "Asymmetric ansa-zirconocenes containing a 2-methyl-4-aryltetrahydroindacene fragment: synthesis, structure, and catalytic activity in propylene polymerization and copolymerization," Organometallics, 2011, 30:5744-5752.

International Search Report and Written Opinion for PCT/EP2015/070889 dated Dec. 15, 2015.

PROCESS FOR PRODUCING PROPYLENE COPOLYMERS IN GAS PHASE

This invention relates to a process for the polymerisation of propylene and ethylene using a bridged bis indenyl catalyst. In particular, the invention relates to the use of catalysts which comprise certain bridged bis indenyl complexes in solid form but free of an external carrier to polymerise ethylene and propylene in the gas phase to form heterophasic copolymers with xylene soluble fractions which are simultaneously high in ethylene content and high in Mw.

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems with different substitution patterns.

These metallocenes can be used in solution polymerisation but results of such polymerisations have generally been poor. These metallocenes are therefore conventional supported on a carrier such as silica. Research has found that heterogeneous catalysis (in which the catalyst particles do not dissolve in the reaction medium) gives rise to better polymer products than homogeneous catalysis (in solution). The use therefore of a support is common place. Despite several years of development of this catalyst technology, there is still room for improved activity, and improved polymer particle formation.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo-transition metal catalyst without using e.g. external porous carrier particles, such as silica, normally required in the art. Thus, problems relating to catalyst silica residues can be solved by this type of catalyst. Further, it could be seen that catalyst particles having improved morphology, will give, due to the replica effect, polymer particles having improved morphology as well.

Although a lot of work has been done in the field of metallocene catalysts, both with conventional supported catalysts as well with solid catalysts prepared according to the principles as described in said WO03/051934, there still remain some problems, which relate especially to the production of polymers with large xylene soluble fractions. The production of such polymers has been found to be challenging, especially when polymers of low melt index (MI) (i.e. high molecular weight, $M_w$) are produced.

There remains a need therefore to find catalysts for olefin polymerisation, which are able to produce polymers with desired properties. As a consequence, the inventors set out to develop a catalyst having a superior polymerisation behaviour than the above mentioned polymerisation catalyst systems regarding one or more of the following characteristics:

improved performance towards the formation of polymers with a large xylene soluble fraction;

improved performance towards high molecular weight propylene ethylene copolymers e.g. as observed via the intrinsic viscosity of the polymer or, more particularly, the intrinsic viscosity of the xylene soluble fraction of that polymer;

obtaining propylene ethylene copolymers with high ethylene content within the xylene soluble fraction.

The present invention enables therefore the formation of a propylene ethylene copolymer having a xylene soluble fraction in which ethylene content is high and also intrinsic viscosity is high. This combination of features advantageously leads to polymers with high impact strength at low temperatures.

The present inventors have now found that a certain class of olefin polymerisation catalysts are able to solve the problems disclosed above. The invention combines known supporting techniques using the catalyst emulsion/solidification techniques of WO03/051934 with a specific group of metallocene complexes based on a bis-indenyl structure in which the 2,4,5 and 6-positions of the indenyl ring must carry a non hydrogen group. Ideally, the 2-position is branched at the β carbon to the cyclopentadienyl ring. The 6-position carries a tertiary alkyl group. This combination surprisingly results in catalysts having good activity in the context of gas phase polymerisation of propylene and ethylene and enables the formation of copolymers having high ethylene contents within the xylene soluble fraction at high intrinsic viscosity of that fraction. This is also achieved at commercially relevant polymerisation temperatures.

Moreover, and surprisingly, the propylene-rich copolymers formed using the catalyst of the present invention exhibit low melt indexes even with increasing ethylene concentration within the xylene soluble fraction.

As we note below, the metallocene complexes used in this invention are not themselves new and other similar metallocene catalysts are known. WO2009/054832 discloses conventionally supported metallocene catalysts in which the metallocenes are branched at the 2-position of the cyclopentadienyl ring in at least one of the ligands making up the catalyst.

WO2007/116034 describes metallocene compounds substituted in the 2-position by a linear alkyl group. In particular the compound dimethylsilyl(2-methyl-4-phenyl-5-methoxy-6-tertbutylinden-1-yl)$_2$ dichlorozirconium is described which carries a methyl group at the 2-position.

WO2006/097497 describes certain symmetrical metallocenes based on tricyclic ring systems (tetrahydroindacenyl).

WO2011/135004 and WO2011/135005 describe rac-Me$_2$Si(2-Me-4-Ph-5-OMe-6-tBuInd)$_2$ZrCl$_2$ but only in the context of propylene homopolymerization.

The complexes used in the process of the invention are described in the WO2012/084961 and suggested for propylene ethylene random copolymerisation for producing random copolymers with low XS content and low ethylene content However, their use explicitly in gas phase polymerisation for the production of the propylene ethylene heterophasic copolymers having the characteristics defined herein is not known.

It has now surprisingly been found that the particular complexes described below in solid form but free from external carrier can be used in propylene ethylene polymerisation in the gas phase for producing heterophasic copolymers. The catalysts enable the formation of polymers with a high xylene soluble fraction in which that fraction has both a high intrinsic viscosity and high ethylene content. It will be appreciated that generally, a high co-monomer content is associated with a reduction in Mw and hence a reduction in intrinsic viscosity. To be able to keep ethylene content high at a high molecular weight allows significant improvements in mechanical properties to be achieved.

SUMMARY OF INVENTION

Thus, viewed from one aspect the invention provides a process for the preparation of a heterophasic copolymer of propylene and ethylene comprising polymerising propylene and ethylene in the gas phase in the presence of a solid particulate catalyst free from an external carrier comprising:

(i) a symmetrical complex of formula (I):

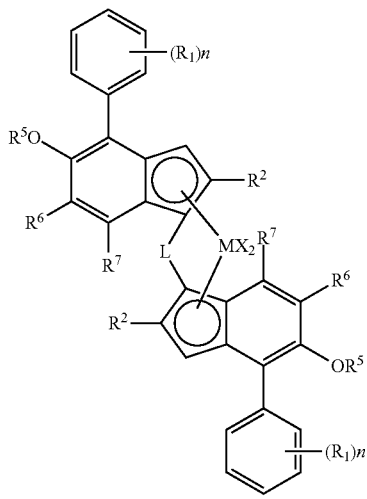

(I)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;
$R^2$ is a C1-C20 hydrocarbyl radical;
$R^5$ is a C1-C20 hydrocarbyl radical;
$R^6$ is a tertiary C4-C20 hydrocarbyl radical;
$R^7$ is a hydrogen atom or a $C_{1-10}$-hydrocarbyl radical;
n is 0 to 3;
$R^1$ is a C1-C20 hydrocarbyl radical and optionally two adjacent $R^1$ groups taken together can form a further mono or multicyclic ring condensed to Ph ring optionally substituted by one or two groups $R^4$; and
$R^4$ is a C1-C10 alkyl radical
and (ii) a cocatalyst, preferably comprising an organometallic compound of a Group 13 metal;
wherein the xylene soluble fraction (XS) of heterophasic copolymer of propylene and ethylene has intrinsic viscosity of at least 1.5 dl/g and an ethylene content of 10 to 70 wt %. Ideally, the XS fraction forms at least 15 wt % of the heterophasic copolymer of propylene and ethylene as a whole.

The catalyst used in the process of the invention is in solid particulate form free from an external carrier. Ideally, the catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Viewed from another aspect therefore, the invention provides a process for the preparation of a heterophasic copolymer of propylene and ethylene as hereinbefore defined in which the catalyst as hereinbefore defined is prepared by obtaining a complex of formula (I) and a cocatalyst as hereinbefore described;
forming a liquid/liquid emulsion system, which comprises a solution of catalyst components (i) and (ii) dispersed in a solvent, and solidifying said dispersed droplets to form solid particles.

The polymer of the invention is a heterophasic copolymer of propylene and ethylene. It will therefore typically contain a matrix component and an amorphous component. Ideally, all steps of the polymerisation process take place at a temperature of at least 60° C. (other than a possible prepolymerisation step which may take place at lower temperature). The polymerisation process takes place in a process configuration comprising at least one gas phase reactor.

Viewed from another aspect the invention provides a process for the preparation of a heterophasic copolymer of propylene and ethylene comprising:
(I) in a first stage polymerising propylene and optionally ethylene in the presence of a solid particulate catalyst free from an external carrier comprising:
(i) a symmetrical complex of formula (I) as hereinbefore defined;
and (ii) a cocatalyst, preferably comprising an organometallic compound of a Group 13 metal; and
(II) in a second subsequent stage polymerising propylene and ethylene in the gas phase in the presence of the product of step (I) and in the presence of the catalyst from step (I);
to produce a heterophasic copolymer of propylene and ethylene wherein the xylene soluble fraction (XS) of the propylene ethylene copolymer has intrinsic viscosity of at least 1.5 dl/g and an ethylene content of 10 to 70 wt %. Ideally, the XS fraction forms at least 15 wt % of the polymer as a whole.

Viewed from another aspect the invention provides a process for the preparation of a heterophasic copolymer of propylene and ethylene comprising:
(I) in a first stage polymerising propylene and optionally ethylene in the gas phase in the presence of a solid particulate catalyst free from an external carrier comprising:
(i) a symmetrical complex of formula (I):

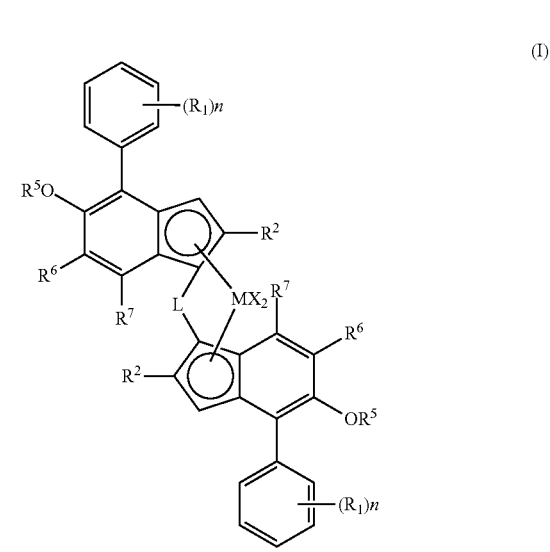

(I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;

R$^2$ is a C1-C20 hydrocarbyl radical;

R$^5$ is a C1-C20 hydrocarbyl radical;

R$^6$ is a tertiary C4-C20 hydrocarbyl radical;

R$^7$ is a hydrogen atom or a $C_{1-10}$-hydrocarbyl radical;

n is 0 to 3;

R$^1$ is a C1-C20 hydrocarbyl radical and optionally two adjacent R$^1$ groups taken together can form a further mono or multicyclic ring condensed to Ph ring optionally substituted by one or two groups R$^4$; and R$^4$ is a C1-C10 alkyl radical and (ii) a cocatalyst, preferably comprising an organometallic compound of a Group 13 metal; and (II) in a second subsequent stage polymerising propylene and ethylene in the gas phase in the presence of the product of step (I) and in the presence of the catalyst from step (I);

to produce a heterophasic copolymer of propylene and ethylene wherein the xylene soluble fraction (XS) of the propylene ethylene copolymer has intrinsic viscosity of at least 1.5 dl/g and an ethylene content of 10 to 70 wt %. Ideally, the XS fraction forms at least 15 wt % of the polymer as a whole.

Viewed from another aspect the invention provides a process for the preparation of a heterophasic copolymer of propylene and ethylene comprising:

(I) in a first stage polymerising propylene and optionally ethylene in bulk in the presence of a solid particulate catalyst free from an external carrier comprising:

(i) a symmetrical complex of formula (I) as hereinbefore defined and (ii) a cocatalyst, preferably comprising an organometallic compound of a Group 13 metal; and (II) in a second subsequent stage polymerising propylene and ethylene in the gas phase in the presence of the product of step (I) and in the presence of the catalyst from step (I);

to produce a heterophasic copolymer of propylene and ethylene wherein the xylene soluble fraction (XS) of the propylene ethylene copolymer has intrinsic viscosity of at least 1.5 dl/g and an ethylene content of 10 to 70 wt %. Ideally, the XS fraction forms at least 15 wt % of the polymer as a whole.

DEFINITIONS

Throughout the description the following definitions are employed.

By free from an external carrier is meant that the catalyst does not contain an external support, such as an inorganic support, for example, silica or alumina, or an organic polymeric support material.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

The term tertiary group such as tertiary alkyl means that a carbon atom within that group is not bound to a hydrogen atom and hence the group in question when bound to a chain binds four other carbon atoms.

Catalyst activity is defined in this application to be the amount of polymer produced/g catalyst/h. The term productivity is also sometimes used to indicate the catalyst activity although herein it designates the amount of polymer produced per unit weight of catalyst.

DETAILED DESCRIPTION OF INVENTION

The complexes and hence catalysts of the invention are based on formula (I) as hereinbefore defined which, inter alia, combines the use of the indenyl ring structure with non H substituents at the 2,4,5 and 6-positions.

The two multicyclic ligands making up the complex of formula (I) are identical and hence the complex of formula (I) is symmetrical (C2 symmetry). The complexes of the invention may be in their meso or racemic forms (or a mixture thereof). Preferably, the racemic (rac) form is used.

M is preferably Zr or Hf, especially Zr.

Each X, which may be the same or different, is preferably a hydrogen atom, a halogen atom, a R, OR, OSO$_2$CF$_3$, OCOR, SR, NR$_2$ or PR$_2$ group wherein R is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical. R is preferably C1-10 alkyl or C6-20 aryl. R is more preferably a $C_{1-6}$ alkyl, phenyl or benzyl group.

Most preferably each X is independently a hydrogen atom, a halogen atom, $C_{1-6}$-alkoxy group or an R group, e.g. preferably a $C_{1-6}$-alkyl, phenyl or benzyl group. Most preferably X is chlorine or a methyl radical. Preferably both X groups are the same.

L is preferably a bridge comprising ethylene or methylene or is a bridge based on a heteroatom, such as silicon or, germanium, e.g. —SiR$^8$$_2$—, wherein each R$^8$ is independently C1-C20-alkyl, C6-C20-aryl or tri(C1-C20-alkyl)silyl-residue, such as trimethylsilyl. More preferably R$^8$ is a $C_{1-8}$ alkyl, e.g. $C_{1-6}$-alkyl, especially methyl. Most preferably, L is a dimethylsilyl, diethylsilyl, methylene or ethylene bridge.

R$^2$ is preferably a suitable branched C4-20 hydrocarbyl group. Preferably R$^2$ is branched β to the cyclopentadienyl ring. By branched β to the cyclopentadienyl ring is meant that the second atom from the cyclopentadienyl ring must be tertiary or quaternary, preferably tertiary, i.e. the second atom from the cyclopentadienyl ring binds to three carbon atoms and one H atom. The R$^2$ radical preferably comprises at least 4 carbon atoms in the chain. It will also be appreciated that where a cyclic group such as a cycloalkyl group, or aryl group is present at the atom 0 to the cyclopentadienyl then there is a branch present.

Preferably $R^2$ is a C4-C12 hydrocarbyl branched β to the cyclopentadienyl ring.

Radical $R^2$ can also be a $CH_2$-cycloalkyl group having 4 to 12 carbon atoms or a $CH_2$-aryl radical containing from 7 to 11 carbon atoms.

In a preferred embodiment, $R^2$ is the group —$CH_2$—$R^{2'}$, i.e. the link to the cyclopentadienyl ring is via a methylene group and $R^{2'}$ represents the remainder of the $R^2$ group, e.g. a C3-19 hydrocarbyl group.

In particular, $R^{2'}$ represents a $C_{3-7}$-cycloalkyl group (optionally substituted by $C_{1-6}$-alkyl), a $C_{6-10}$-aryl group, especially phenyl or tolyl or an $C_{3-8}$-alkyl group (such that the beta position to the cyclopentadienyl is branched).

In a further preferred embodiment therefore, $R^2$ is a group $CH_2$—$C(R_3)_{3-q}(H)_q$ wherein each $R_3$ is a $C_{1-6}$-alkyl group or together two $R_3$ groups form a $C_{3-7}$-cycloalkyl ring. The subscript q can be 1 or 0.

$R^2$ is ideally an isobutyl, —$CH_2C(Me)_3$ or —$CH_2CH(Me)$(Et) group. Alternatively, $R^2$ is —$CH_2C_6H_{11}$ where $C_6H_{11}$ is cyclohexyl, $CH_2C_6H_{11}$(Me) where the cyclohexyl is substituted by methyl or —$CH_2C_6H_5$ (benzyl).

Preferably $R^6$ is tertiary, e.g. cyclic or acyclic, $C_{4-20}$ alkyl, C6-C20-aryl, C7-C20-alkylaryl or C7-C20-arylalkyl radical. Preferably $R^6$ is a tertiary $C_{4-10}$ alkyl group.

Preferably $R^6$ is a C4-C10 branched alkyl or is an alkylcycloalkyl group. Preferred options include, tert-butyl, 1-alkylcyclopentyl or 1-alkylcyclohexyl such as 1-methylcyclopentyl or 1-methylcyclohexyl.

$R^7$ is preferably a hydrogen atom or $C_{1-6}$ alkyl such as methyl, ethyl, propyl or isopropyl group, most preferably methyl or especially hydrogen.

The subscript n can be zero or 1 to 3. The phenyl ring is thus unsubstituted or carries one to three substituents. The optional substituent on any Ph group is $R^1$. If present, there should be 1 to 3 $R^1$ groups, preferably one or two $R^1$ groups.

Preferably $R^1$ is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical. Preferably $R^1$ is a linear or branched, cyclic or acyclic, C1-C10-alkyl group, especially a linear or branched C1-6 alkyl group. Most preferably $R^1$ is a tert-butyl group. It is however most preferred if n is zero.

It is preferred that any $R^1$ group present is located at 3, 4 and/or 5 position to the bond to the indenyl group, e.g. the 4-position.

In one preferred embodiment two adjacent $R^1$ groups taken together can form a further mono or multicyclic ring condensed to Ph. The new ring is preferably 5 or 6 membered or the $R^1$ groups preferably form two new rings such as one further five membered and six membered ring.

The new ring or rings can be aliphatic or aromatic. Preferably any new ring forms an aromatic system with the Ph ring to which it is attached.

In this way groups such as indolyl, carbazolyl, benzothiophenyl and naphthyl can be formed. It is also within the scope of the invention for these new rings to be substituted by 1 or 2 $R^4$ groups where $R^4$ is a C1-10 alkyl.

$R^5$ is preferably a C1-10 hydrocarbyl group, more preferably a $C_{1-10}$ alkyl or $C_{6-10}$ aryl group, especially a $C_{1-6}$ alkyl. The use of methyl or ethyl is most preferred.

In a preferred embodiment therefore the complex of the invention is of formula (II)

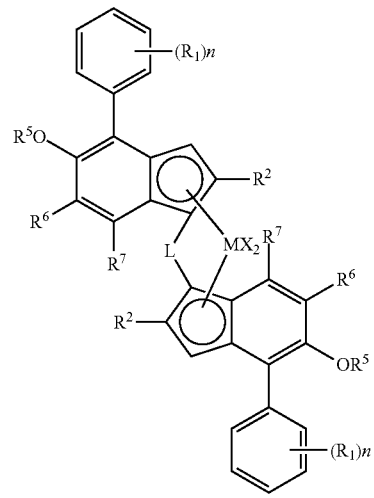

(II)

wherein

M is Zr or Hf;

$R^2$ is $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

L is methylene, ethylene or $SiR^8_2$;

$R^8$ is C1-10 alkyl, $C_{6-10}$-aryl, $C_{7-12}$-alkylaryl, or $C_{7-12}$-arylalkyl;

each X is a hydrogen atom, benzyl, OR, a halogen atom, or an R group;

R is $C_{1-10}$ alkyl or $C_{6-10}$ aryl;

each $R^7$ is H or $C_{1-3}$-alkyl;

n is 0 to 2;

$R^1$ is $C_{1-10}$-alkyl;

$R^5$ is $C_{1-10}$ alkyl; and $R^6$ is tertiary $C_{4-10}$-alkyl;

and wherein the two ligands forming the complex are identical.

In a still further preferred embodiment, the invention provides a complex of formula (III)

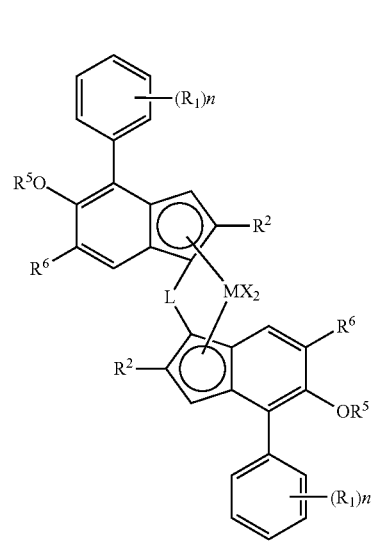

(III)

in which:

M is Zr or Hf each $R^2$ is $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

L is $SiR^8_2$;

$R^8$ is $C_{1-8}$ alkyl;

each X is a halogen atom, methoxy, benzyl or methyl;

n is 0 or 1;

$R^5$ is $C_{1-6}$ alkyl;

$R^6$ is tertiary $C_{4-10}$ alkyl; and $R^1$ is $C_{1-6}$ alkyl;

and wherein the two ligands forming the complex are identical.

In a further highly preferred embodiment, the invention provides a complex of formula (IV)

(IV)

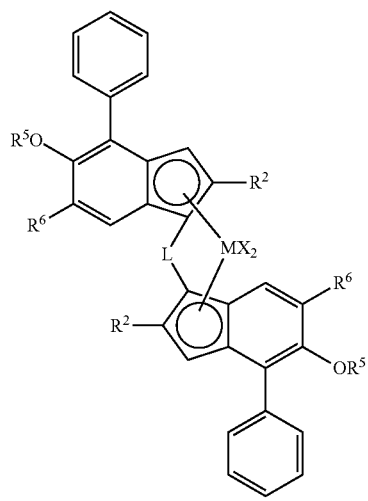

wherein L is $SiR^8_2$;

$R^8$ is $C_{1-8}$ alkyl;

$R^2$ is $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

each X is a halogen atom, methoxy, benzyl or methyl;

M is Zr; or Hf;

$R^5$ is $C_{1-6}$ alkyl; and $R^6$ is tertiary $C_{4-10}$ alkyl;

and wherein the two ligands forming the complex are identical.

A still further especially preferred complex of the invention is of formula (V)

(V)

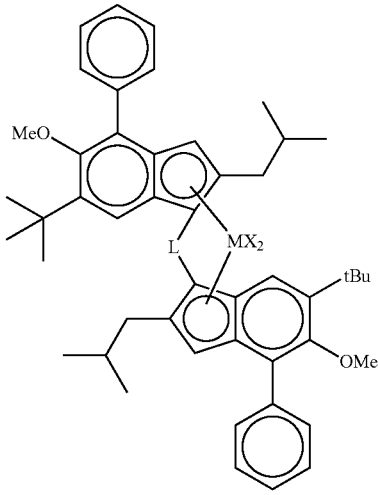

wherein L is $SiR^8_2$;

$R^8$ is $C_{1-8}$ alkyl;

each X is a halogen atom, methoxy, benzyl or methyl; and

M is Zr; most especially

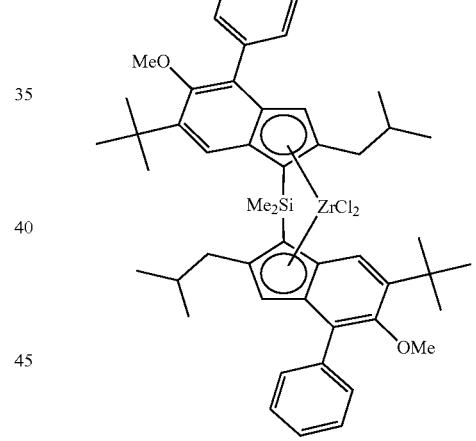

For the avoidance of doubt, any narrower definition of a substituent offered above in connection with any formula can be combined with any other broad or narrow definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2007/116034 and the other prior art references mentioned above disclose the necessary chemistry and are herein incorporated by reference.

Schemes summarise a possible synthetic route:
Route

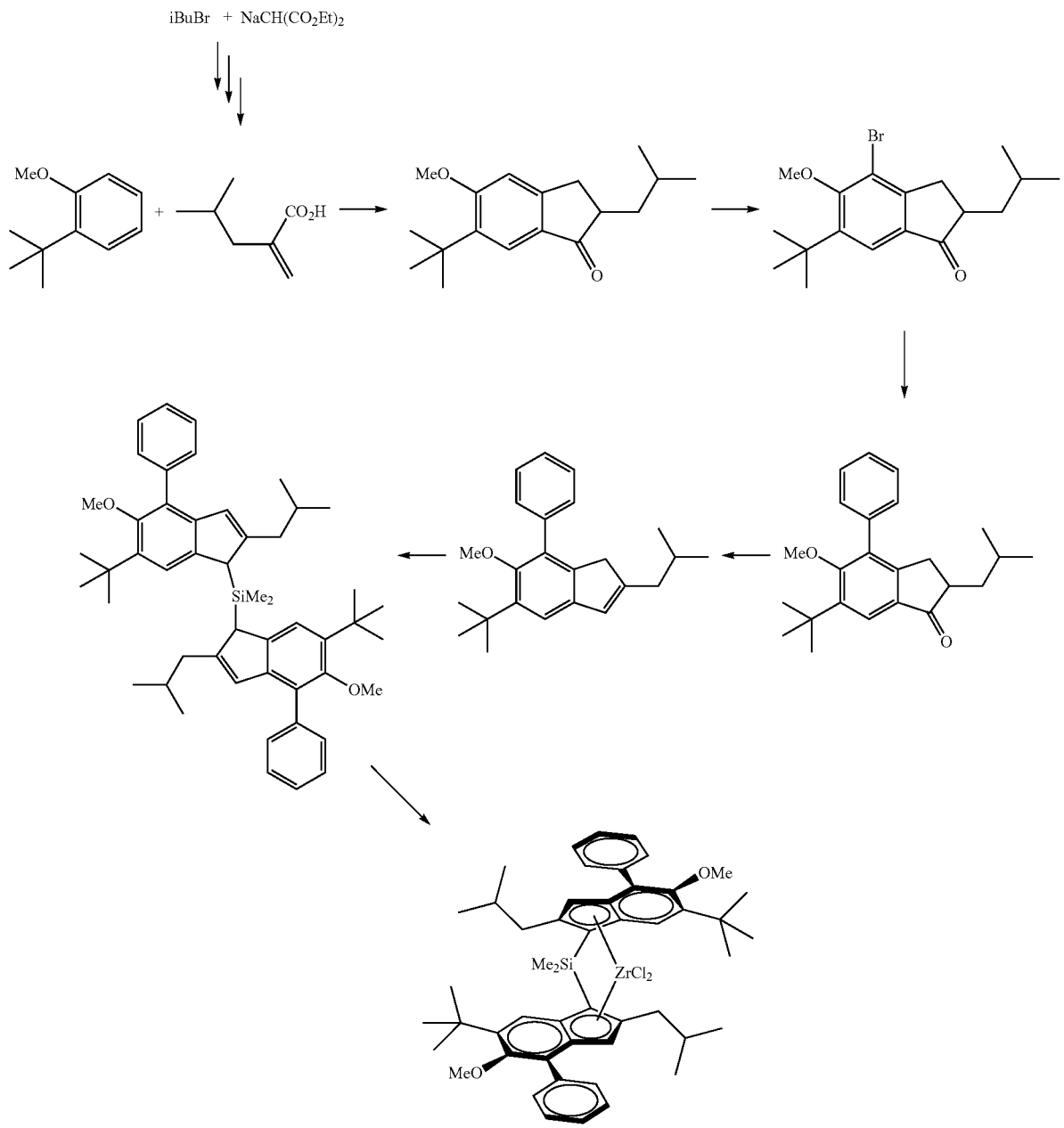

Scheme 1

The bis-indenyl ligand can be prepared following a synthetic strategy as outlined in Scheme 1. The key intermediate, the 6-tert-butyl-2-isobutyl-5-methoxyindan-1-one, was prepared by acylation of 2-tert-butylanisol with 2-isobutylacrylic acid followed by Nazarov cyclisation. Subsequent bromination, cross-coupling reaction with sodium tetraphenyl borate and reduction/dehydration of the obtained indanone gave the 5-tert-butyl-2-isobutyl-6-methoxy-7-phenyl-1H-indene. Reaction of its lithium salt with dichlorodimethylsilane produced the actual ligand bis(6-tert-butyl-2-isobutyl-5-methoxy-4-phenyl-1H-inden-1-yl)(dimethyl) silane in almost quantitative yield.

The dimethylsilyl-bis(2-isobutyl-4-phenyl-5-methoxy-6-tert-butylinden-1-yl) zirconium dichloride metallocene can then be generated by transmetalation of the dilithium salt of the ligand with zirconium tetrachloride in toluene.

Preparation of ligand of formula (IX) was analogous for the ligand of formula (VIII), however using as starting material 2-(2,2-dimethylpropyl)acrylic acid instead of 2-isobutylacrylic acid. Detailed preparation is disclosed in the experimental part.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention.

The olefin polymerisation catalyst system of the invention comprises (i) a complex in which the metal ion is coordinated by a ligand of the invention; and normally (ii) an aluminium alkyl compound (or other appropriate cocatalyst), or the reaction product thereof. Thus the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. $Al(C_{1-6}\text{-alkyl})_3$. can be used.

Boron based cocatalysts of interest include those of formula $$BY_3$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are p-fluorophenyl, 3,5-difluorophenyl, pentafluorophenyl, 3,4,5-trifluorophenyl and 3,5-di(trifluoromethyl)phenyl. Preferred boron based catalysts are tris(4-fluorophenyl)borane, tris(3,5-difluorophenyl)borane, tris(2,4,6-trifluorophenyl)borane, tris(pentafluorophenyl)borane, and/or tris (3,4,5-trifluorophenyl)borane.

Particular preference is given to tris(pentafluorophenyl)borane.

It is preferred however if borates are used, i.e. compounds containing a borate 3+ ion. Such ionic cocatalysts preferably contain a non-coordinating anion such as tetrakis(pentafluorophenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate. Preference is given to triphenylcarbeniumtetrakis(pentafluorophenyl)borate, N,N-dimethylcyclohexylammoniumtetrakis(pentafluorophenyl)borate or N,N-dimethylbenzylammoniumtetrakis(pentafluorophenyl)borate.

The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4{}^{2-}$ is especially preferred.

Suitable amounts of cocatalyst will be well known to the skilled man.

Manufacture

The catalyst of use in the process of the invention is in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained.

By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component(s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component(s). Said solvent is chosen so that it dissolves said catalyst component(s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$, —COOH, —COONH$_2$, oxides of alkenes, —CR''=$CH_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$. —COOH, —$COONH_2$, oxides of alkenes, —CR"=$CH_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e. g. be subjected to an immediate (within milliseconds to few seconds) temperature change in order to achieve an instant solidification of the component (s) within the droplets. The appropriate temperature change, i. e. an increase or a decrease in the temperature of an emulsion system, required for the desired solidification rate of the components cannot be limited to any specific range, but naturally depends on the emulsion system, i. a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component(s) is (are) immiscible and which is inert in relation to the catalyst component(s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e. g. up to 10° C. per minute, preferably 0.5 to 6° C. per minute and more preferably in 1 to 5° C. per minute.

In case a melt of e. g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e. g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e. g. if the amount of the monomer used for the prepolymerisation is relatively large.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e. g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Prepolymerisation ("Off-Line Prepolymerisation")

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree (DP) defined as weight of polymer matrix/ weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimising leaching of catalyst components and thus local overheating.

After prepolymerisation, the catalyst can be isolated and stored.

Polymerisation

The invention relates to the copolymerisation of propylene and ethylene for producing heterophasic polymers. The polymer formed contains predominantly propylene. There is ideally no other comonomer than ethylene present. The content of ethylene in the xylene soluble (XS) fraction of the polymers of the invention is at least 10 wt % ethylene or more. Ethylene amount in the whole polymer is preferably more than 6 wt-%.

Polymerization in the method of the invention may be effected in one or more, e.g. 1, 2 or 3, polymerization reactors of which at least one reactor is a gas phase reactor. The process may also involve a prepolymerisation step. This prepolymerisation step is a conventional step used routinely in polymer synthesis and is to be distinguished from the catalyst prepolymerisation step discussed above.

Preferably, the process of the invention employs two main reactors, either two gas phase reactors or the first reactor operating in bulk and a second gas phase reactor, the latter configuration being preferred. The process may also utilise a prepolymerisation step.

The inventive process of the invention is ideally suited for the preparation of a heterophasic propylene ethylene copolymer. In that process, a homopolymer matrix or random ethylene copolymer matrix can be formed. It is preferred if a homopolymer matrix is formed. The matrix component is combined with a copolymeric amorphous fraction to form the heterophasic copolymer of the invention. It will be appreciated that the xylene soluble content of the heterophasic polymer is primarily derived from the amorphous component.

Ideally therefore a propylene homopolymer matrix is formed in bulk and a propylene ethylene copolymer amorphous phase formed in the gas phase reactor.

For bulk and gas phase copolymerisation reactions, the reaction temperature used will generally be in the range 60 to 115° C. (e.g. 70 to 90° C.), the reactor pressure will generally be in the range 10 to 25 bar for gas phase reactions with bulk polymerisation operating at slightly higher pressures. The residence time will generally be 0.25 to 8 hours (e.g. 0.5 to 4 hours). The gas used will be the monomer optionally as mixture with a non-reactive gas such as nitrogen or propane. It is a particular feature of the invention that polymerisation takes place at temperatures of at least 60° C. in all steps of the invention.

Generally the quantity of catalyst used will depend upon the nature of the catalyst, the reactor types and conditions and the properties desired for the polymer product. As is well known in the art hydrogen can be used for controlling the molecular weight of the polymer.

The catalysts of the invention enable the formation of high molecular weight, polymers. $MFR_2$ values of the final polymer may be in the range of 0.05 to 50 g/10 min, such as 0.1 to 40 g/10 min.

The xylene soluble (XS) content of the polymers of the invention preferably is 15 wt % or more, such as 15 to 70 wt %, more preferably 20 to 60 wt %, especially 30 to 50 wt %, most especially 35 to 50 wt %.

The C2 content of the XS component of the polymers may be at least 10 wt %, such as at least 14 wt %. The upper limit for C2 content in the XS fraction may be 70 wt %, such at 65 wt %, preferably 60 wt-%.

The intrinsic viscosity of the XS component may be at least 1.5 dl/g, such as at least 1.8 dl/g. The upper limit for the intrinsic viscosity of the XS component might be 6 dl/g.

The polymers made by the catalysts of the invention are useful in all kinds of end articles such as pipes, films (cast, blown or BOPP films), fibers, moulded articles (e.g. injection moulded, blow moulded, rotomoulded articles), extrusion coatings and so on.

The invention will now be illustrated by reference to the following non-limiting Examples.
Measurement Methods:
ICP Analysis The elemental analysis of a catalyst was performed by taking a solid sample of mass M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental iCAP 6300 Inductively Coupled Plasma-Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% $HNO_3$, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% $HNO_3$, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The values reported in Table 4 are an average of three successive aliquots taken from the same sample and are related back to the original catalyst by inputting the original mass of sample and the dilution volume into the software.
Melt Flow Rate The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg ($MFR_2$) or 21.6 kg ($MFR_{21}$).

GPC: Molecular weight averages, molecular weight distribution, and polydispersity index (Mn, Mw, MWD)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2× GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.
Xylene Solubles (XS)

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks. The solution from the first 100 ml vessel is evaporated in nitrogen flow and the residue is dried under vacuum at 90° C. until constant weight is reached.

XS %=(100·m·Vo)/(mo·v); mo=initial polymer amount (g); m=weight of residue (g); Vo=initial volume (ml); v=volume of analysed sample (ml).
Catalyst Activity The catalyst activity was calculated on the basis of following formula:

$$\text{Catalyst Activity}(kg/g^*h) = \frac{\text{amount of polymer produced (kg)}}{\text{catalyst loading(g)} \times \text{polymerisation time(h)}}$$

Comonomer Content by $^{13}$C NMR

Quantification of Microstructure by NMR Spectroscopy

Quantitative nuclear-magnetic resonance (NMR) spectroscopy was used to quantify the comonomer content of the polymers.

Quantitative $^{13}$C {$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}$C {$^1$H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer:

$$fE=(E/(P+E)$$

The comonomer fraction was quantified using the method of W-J. Wang and S. Zhu, Macromolecules 2000, 33 1157, through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

Ethylene Content (FTIR C$_2$)

Ethylene content was measured with Fourier transform infrared spectroscopy (FTIR) calibrated to results obtained by $^{13}$C NMR spectroscopy using a method which accounts for regio-irregular propylene insertion. When measuring the ethylene content in polypropylene, a thin film of the sample (thickness about 0.220 to 0.250 mm) was prepared by hot pressing at 230° C. (preheat 5 min., press 1 min., cooling (cold water) 5 min.) using a Graseby Specac press. The FTIR spectra of the sample was recorded immediately with Nicolet Protégé 460 spectrometer from 4000 to 400 cm$^{-1}$, resolution 4 cm$^{-1}$, scans 64. The area of absorption peak at 733 cm$^{-1}$ (baseline from 700 cm$^{-1}$ to 760 cm$^{-1}$) and height of reference peak at 809 cm$^{-1}$ (baseline from 780 cm$^{-1}$ to 880 cm$^{-1}$) were evaluated. The result was calculated using the following formula $$E_{tot}=a \times A/R+b$$

where

A=area of absorption peak at 733 cm$^{-1}$

R=height of reference peak at 809 cm$^{-1}$ $E_{tot}$=C2 content (wt.-%)

a, b are calibration constants determined by correlation of multiple calibration standards of know ethylene content as determined by $^{13}$C NMR spectroscopy to A/R.

The result was reported as an average of two measurements.

Intrinsic Viscosity

Measured according to DIN ISO 1628/1, October 1999 (in Decalin at 135° C.).

Prepolymerisation degree: weight of polymer matrix/weight of solid catalyst before prepolymerisation step

EXAMPLES

General Procedures and Starting Materials

All manipulations with air and moisture sensitive compounds were performed either in an atmosphere of thoroughly purified argon using a standard Schlenk technique or in a controlled atmosphere Glove Box (Mecaplex, VAC or M. Braun).

MAO was purchased from Albermarle and used as a 30 wt-% solution in toluene. Perfluoroalkylethyl acrylate esters (CAS number 65605-70-1) (used as surfactant) was purchased from the Cytonix corporation, dried over activated molecular sieves (2 times) and degassed by argon bubbling prior to use. Hexadecafluoro-1,3-dimethylcyclohexane (PFC) was dried over activated molecular sieves (2 times) and degassed by argon bubbling prior to use. Propylene is provided by Borealis and adequately purified before use.

Example 1 rac-Dimethylsilylene-bis(6-tert-butyl-2-isobutyl-5-methoxy-4-phenyl-1H-inden-1-yl)zirconium dichloride

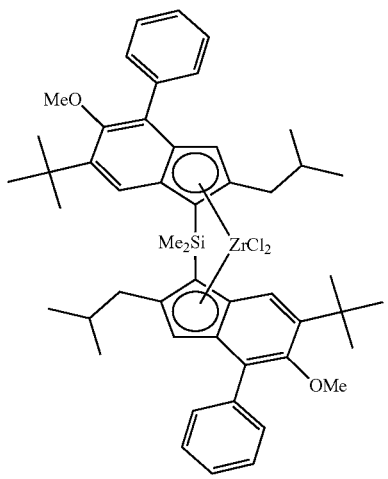

was prepared as described in example 1 of WO2012084961.

Catalyst Example 1 (E1)

Inside the glovebox, 80 μL of dry and degassed surfactant solution were mixed with 2 mL of MAO in a septum bottle and left to react overnight. The following day, 73.4 mg of the metallocene toluene solvate (67.2 mg of metallocene+6.2 mg of toluene) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red-orange emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.39 g of a red free flowing powder was obtained.

TABLE 1

Catalyst syntheses summary

| Catalyst | Yield | Al (%) | Zr (%) | Al/Zr (molar) |
|---|---|---|---|---|
| E1 | 0.39 g | 28.7 | 0.33 | 294 |

E1-p Catalyst Preparation/Prepolymerization Procedure

Catalyst pre-polymerisation experiments were done in a 125 mL pressure reactor equipped with gas-feeding lines and an overhead stirrer. Dry and degassed perfluoro-1,3-dimethylcyclohexane (15 cm$^3$) and the desired amount of the red catalyst to be pre-polymerised were loaded into the reactor inside a glovebox and the reactor was sealed. The reactor was then taken out from the glovebox and placed inside a water cooled bath. The overhead stirrer and the feeding lines were then connected. The feeding line was pressurized with hydrogen, and the experiment was started by opening the valve between the H2 feeding line and the reactor. At the same time propylene feed was started through the same H2 feeding line in order to ensure that all the hydrogen would be fed into the reactor. The propylene feed was left open, and the monomer consumption was compensated by keeping the total pressure in the reactor constant (about 5 barg). The experiment was continued until a polymerisation time sufficient to provide the desired degree of polymerisation. The reactor was then taken back inside the glovebox before opening and the content was poured into a glass vessel. The perfluoro-1,3-dimethylcyclohexane was evaporated until a constant weight was obtained to yield a pre-polymerised pink catalyst. The degree of polymerisation was determined gravimetrically and/or by analysis of the ash and/or aluminium content of the catalyst. Prepolymerisation degree is 3,9.

Comparison Catalyst Example (C1)

Prepolymerised C1 (C1-p)

Rac-cyclohexyl(methyl)silanediylbis(2-methyl-4-(4'-tertbutylphenyl)indenyl) zirconium dichloride This catalyst was prepared as described in example 10 of WO2010/052263 and off-line prepolymerized as described above, until a prepolymerisation degree of 3,1 had been reached.

Comparison Catalyst Example (C2)

Prepolymerised C2 (C2-p)

Anti-Dimethylsilylene(2-methyl-4-phenyl-5-methoxy-6-tert-butyl-indenyl)(2-methyl-4-phenyl-6-tert-butyl-indenyl)zirconium dichloride This catalyst was prepared as described in WO2013007650 examplemetallocene E1, catalyst E1, and off-line prepolymerized as described in the same application (off-line prepolymerized catalyst E1p), until a prepolymerisation degree of 3,5 had been reached

Polymerization Examples: Bulk Propylene Homopolymerization Followed by Gas Phase Ethylene/Propylene Copolymerization

Polymerisation Example 1 (PE1) Using Catalyst E1-p

1) Bulk

A stirred autoclave (double helix stirrer) with a volume of 21.2 dm$^3$ containing 0.2 barg propylene was filled with additional 3.97 kg propylene. After adding an initial amount of 0.2 NL H2 (Air Liquide, quality 6.0) and 1.83 mmol triethylaluminium (Aldrich, 1 molar solution in n-hexane) using a stream of 250 g propylene, the solution was stirred at 20° C. and 250 rpm for 20 min, then the reactor was brought up to the set temperature of 40° C., then the catalyst was injected as described in the following.

The solid, pre-polymerized catalyst (type, amount and degree of prepolymerisation as listed in table 2) was loaded into a stainless steel vial inside the glovebox, the vial was attached to the autoclave, then a second vial containing 5 ml of perfluoro-1,3-dimethylcyclohexane (PFC) and pressurized with 60 bars of N2 was added on top, the valve between the two vials was opened and the solid catalyst was contacted with the PFC under N2-pressure (0.003 mol at ~10 barg) for 60 s, then flushed into the reactor with 250 g propylene. Stirring speed was increased to 350 rpm and the temperature in the reactor was increased to the polymerization temperature. This temperature was held constant throughout the polymerization. The polymerization time was measured starting when the temperature reached 2° C. below the set polymerization temperature 2) Transition and Gas Phase At the end of the bulk step, the stirrer speed was adjusted to 20 rpm and the temperature controller set to 60° C. Then the reactor was vented to 0.3 barg. The stirrer speed was increased to 250 rpm and propylene-ethylene dosing via flow controller was started. Flow C3: 28.6 g/min. Flow C2: 23.3 g/min. Ratio: 1.23 g/g. When a total amount of 224 g Propylene and 181 g Ethylene were dosed, target pressure of 15 barg and reactor temperature of 60° C. were reached, the reactor pressure was held constant with a C3/C2 ratio of 2.13 (g/g) via a flow controller until 210 g of this comonomer mixture was consumed. Duration: 76 min. In this time interval the reactor temperature was held constant at 60° C. and the reactor pressure constant at 15 barg.

3) Cooling and Flushing

Afterwards the stirrer speed was set to 20 rpm and the monomers were vented to 1 barg and the temperature controller set to 30° C. Respectively twice pressured up to 5 barg with N2 and flushed down to 1 barg. Thereafter the reactor was evacuated for 10 min and filled again with N2 to 3 barg, then flushed to 1 barg. The reactor was then opened. The product was taken out and dried overnight in a hood and additionally 2 hours in a vacuum drying oven at 60° C. After weighing, the material was additivated with 0.2 w % Ionol and 0.1 w % PEPQ.

Polymerisation Example 2 (PE2) Using Catalyst E1-p

1) Polymerisation in Bulk was Carried out as in PE1.
2) Transition and Gas Phase At the end of the bulk step, the stirrer speed was adjusted to 20 rpm and the temperature controller set to 60° C. Then the reactor was vented to 0.3 barg. Then the stirrer speed was increased to 250 rpm and propylene-ethylene dosing via flow controller was started. Flow C3: 13.1 g/min. Flow C2: 33.0 g/min. Ratio: 0.4 g/g. When a total amount of 98 g propylene and 244 g ethylene were dosed, target pressure of 15 barg and reactor temperature of 60° C. were reached, the reactor pressure was held constant with a C3/C2 ratio of 1.36 g/g via a flow controller until 250 g of this comonomer mixture was consumed. Duration: 153 min. In this time interval the reactor temperature was held constant at 60° C. and the reactor pressure constant at 15 barg.
3) Cooling and Flushing was Done as in PE1—

Polymerisation Example 3 (PE3) Using Catalyst E1-p

1) Polymerisation in Bulk was Carried Out as in PE1.
2) Transition and Gas Phase At the end of the bulk step, the stirrer speed was adjusted to 100 rpm and temperature controller set to 60° C. Then the reactor was vented to 1 barg. Then the stirrer speed was increased to 250 rpm and propylene-ethylene dosing via flow controller was started. Flow C3: 83 g/min. Flow C2: 38 g/min. Ratio: 2.18 g/g. When a total amount of 317 g propylene and 145 g ethylene were dosed, target pressure of 15 barg and reactor temperature of 60° C. were reached, the reactor pressure was held constant with a C3/C2 ratio of 3.7 g/g via a flowcontroller until 225 g of this comonomer mixture was consumed. Duration: 82 min. In this time interval the reactor temperature was held constant at 60° C. and the pressure constant at 15 barg.
3) Cooling and Flushing was Done as in PE1

Comparison Polymerisation Example 1 (PC1) Using Comparative Catalyst C1-p

1) Bulk

A stirred autoclave (double helix stirrer) with a volume of 21.2 dm³ containing 0.2 barg propylene was filled with additional 3.97 kg propylene. After adding an initial amount of 0.4 NL H2 (Air Liquide, quality 6.0) and 1.83 mmol triethylaluminium (Aldrich, 1 molar solution in n-hexane) using a stream of 250 g propylene, the solution was stirred at 20° C. and 250 rpm for 20 min, then the reactor was brought up to the set prepolymerization temperature of 40° C., then the catalyst was injected as described in the following.

The solid, pre-polymerized catalyst (type, amount and degree of polymerisation as listed in table 2) was loaded into a stainless steel vial inside the glovebox, the vial was attached to the autoclave, then a second vial containing 5 ml perfluoro-1,3-dimethylcyclohexane (PFC) and pressurized with 60 bars of N2 was added on top, the valve between the two vials was opened and the solid catalyst was contacted with the PFC under N2-pressure (0.003 mol at ~10 barg) for 60 s, then flushed into the reactor with 250 g propylene. Stirring speed was increased to 350 rpm and pre-polymerisation was run for 15 min. At the end of the prepolymerization step a second amount of H2 to achieve the target MFR2 was added and the temperature in the reactor increased to the polymerization temperature. This temperature was held constant throughout the polymerization. The polymerization time was measured starting when the temperature reached 2° C. below the set polymerization temperature 2) Transition and Gas Phase At the end of the bulk step, the stirrer speed was adjusted to 20 rpm and the temperature controller set to 60° C. Then the reactor was vented to 0.3 barg. Then the stirrer speed was increased to 250 rpm and propylene-ethylene dosing via Flow controller was started. Flow C3: 28.6 g/min. Flow C2: 23.3 g/min. Ratio: 1.23 g/g. When a total amount of 246 g Propylene and 182 g Ethylene were dosed, target pressure of 15 barg and reactor temperature of 60° C. were reached, the reactor pressure was held constant with a C3/C2 ratio of 1.9 g/g via a flow controller until 352 g of this comonomer mixture was consumed. Duration: 124 min. In this time interval the reactor temperature was held constant at 60° C. and the reactor pressure constant at 15 barg.
3) Cooling and Flushing was Done as in PE1

Comparison Polymerisation Example 2 (PC2) Using Comparative Catalyst C1-p

1) Bulk

A stirred autoclave (double helix stirrer) with a volume of 21.2 dm³ containing 0.2 barg propylene was filled with additional 5.18 kg propylene. After adding an initial amount of 0.21 n H2 (Air Liquide, quality 6.0) and 0.97 mmol triethylaluminium (Aldrich, 1 molar solution in n-hexane) using a stream of 250 g propylene, the solution was stirred at 20° C. and 250 rpm for 20 min, then the reactor was brought up to the set temperature of 40° C., then the catalyst was injected as described in the following.

The solid, pre-polymerized catalyst (type, amount and degree of polymerisation as listed in table 2) was loaded into a stainless steel vial inside the glovebox, the vial was attached to the autoclave, then a second vial containing 5 ml perfluoro-1,3-dimethylcyclohexane and pressurized with 60 bars of N2 was added on top, the valve between the two vials was opened and the solid catalyst was contacted with the perfluoro-1,3-dimethylcyclohexane under N2-pressure (0.003 mol at ~10 barg) for 60 s, then flushed into the reactor with 491 g propylene. Stirring speed was increased to 350 rpm and the temperature in the reactor to the polymerization temperature. This temperature was held constant throughout the polymerization. The polymerization time was measured starting when the temperature reached 2° C. below the set polymerization temperature.

2) Transition and Gas Phase

At the end of the bulk step, the stirrer speed was adjusted to 20 rpm and the temperature controller set to 60° C. Then the reactor was vented to 0.1 barg. Then the stirrer speed was increased to 250 rpm and propylene-ethylene dosing via flow controller was started. Flow C3: 28.6 g/min. Flow C2: 23.3 g/min. Ratio: 1.23 g/g. After a total amount of 248 g Propylene and 188 g Ethylene have been dosed, target pressure of 15 barg and reactor temperature of 60° C. were reached, the reactor pressure was held constant with a C3/C2 ratio of 1.88 g/g via a flow controller until 297 g of this comonomer mixture was consumed. Duration: 90 min. In this time interval the reactor pressure was held constant at 15 barg.

3) Cooling and Flushing was Done as in PE1.

Comparison Polymerisation Example 3 (PC3), Using Comparative Catalyst C2-p

1) Bulk

A stirred autoclave (double helix stirrer) with a volume of 21.2 dm³ containing 0.2 barg propylene was filled with additional 5.18 kg propylene. After adding an initial amount of 0.21 n H2 (Air Liquide, quality 6.0) and 0.97 mmol triethylaluminium (Aldrich, 1 molar solution in n-hexane) using a stream of 250 g propylene, the solution was stirred at 20° C. and 250 rpm for 20 min, then the reactor was brought up to the set prepolymerization temperature of 40° C., then the catalyst was injected as described in the following.

The solid, pre-polymerized catalyst (type, amount and degree of polymerisation as listed in table 2) was loaded into a stainless steel vial inside the glovebox, the vial was attached to the autoclave, then a second vial containing 5 ml perfluoro-1,3-dimethylcyclohexane (PFC) and pressurized with 60 bars of N2 was added on top, the valve between the two vials was opened and the solid catalyst was contacted with the PFC under N2-pressure (0.003 mol at ~10 barg) for 60 s, then flushed into the reactor with 500 g propylene. Stirring speed was increased to 350 rpm and the temperature in the reactor was increased to the polymerization temperature. This temperature was held constant throughout the polymerization. The polymerization time was measured starting when the temperature reached 2° C. below the set polymerization temperature 2) Transition and Gas Phase At the end of the bulk step, the stirrer speed was adjusted to 20 rpm and temperature controller set to 60° C. Then the reactor was vented to 0.0 barg. Then the stirrer speed was increased to 250 rpm and propylene-ethylene dosing via flow controller was started.

Flow C3: 28.6 g/min. Flow C2: 23.2 g/min. Ratio: 1.23 g/g. When a total amount of 239 g propylene and 190 g ethylene were dosed, target pressure of 15 barg and reactor temperature of 60° C. were reached, the reactor pressure was held constant with a C3/C2 ratio of 1.83 g/g via a flowcontroller until 523 g of this comonomer mixture was consumed. Duration: 56 min. In this time interval the reactor temperature was held constant at 60° C. and the reactor pressure constant at 15 barg.

3) Cooling and Flushing was Done as in PE1.

Polymerisation Conditions and Polymer Properties are Presented in Table 2

TABLE 2

Polymerisation conditions and polymer properties

| Polymerisation | Unit | PE1 | PE2 | PE3 | PC1 | PC2 | PC3 |
|---|---|---|---|---|---|---|---|
| Catalyst | | E1-p | E1-p | E1-p | C1-p | C1-p | C2-p |
| Off-line prepolymerized catalyst amount | mg | 100 | 100 | 100 | 397 | 494 | 298 |
| TEA (1molar) | ml | 1.83 | 1.83 | 1.83 | 1.83 | 0.97 | 0.97 |
| T prepolymerisation | ° C. | 40 | 40 | 40 | 40 | 40 | 40 |
| time prepol | min | 0 | 0 | 0 | 15 | 0 | 0 |
| H2 | NL | 0.2 | 0.2 | 0.2 | 0.4 | 0.2 | 0.2 |
| T bulk | ° C. | 70 | 70 | 70 | 70 | 70 | 70 |
| total H2 in the bulk step | NL | 0.2 | 0.2 | 0.2 | 2.0 | 0.2 | 0.2 |
| time | min | 30 | 30 | 30 | 30 | 30 | 30 |
| Gas phase | | | | | | | |
| Total pressure(average) | barg | 15 | 15 | 15 | 15 | 15 | 15 |
| total H2 in gas phase | NL | 0.00 | 0.00 | 0.00 | 0.00 | 0.00 | 0.00 |
| T gas phase | ° C. | 60 | 60 | 60 | 60 | 60 | 60 |
| time | min | 77 | 154 | 82 | 124 | 90 | 56 |
| Act. In gas phase* | Kgpol/gcath | 8.1 | 4.8 | 8.1 | 1.8 | 1.6 | 8.4 |
| MFR2 (final polymer) | g/10 min | 0.1 | 0.1 | 0.07 | 57.35 | 2.43 | 0.47 |
| XS | wt % | 40.0 | 46.5 | 32.9 | 25.8 | 35.8 | 38.0 |
| C2 in xylene soluble fraction | wt % | 19.5 | 33.8 | 14.2 | 23.2 | 23.6 | 25.0 |
| Intrinsic viscosity of xylene soluble fraction | dL/g | 1.9 | 1.8 | 2.3 | 0.5 | 0.6 | 1.1 |

*Based on the amount of non-prepolymerised catalyst

From the table it can be seen that the polymers produced according to the present invention have high Intrinsic viscosity (IV) in the xylene soluble fraction (XS) with C2 amount in XS being above 14 wt-%, whereas said IV(XS) of the comparative examples is lower with C2 in XS amounts being within the range of the inventive examples. Still the activity is good in gas phase polymerization step in the inventive examples. It can be seen that said activity of the comparative example PC3 is is also good, but IV in XS is lower than in the inventive examples. Thus, the present invention provides a combination of good activity with high IV in xylene soluble fraction within a broad range of C2 amount.

The invention claimed is:

1. A process for the preparation of a heterophasic copolymer of propylene and ethylene comprising:

(I) in a first stage polymerising propylene and optionally ethylene in the presence of a solid particulate catalyst free from an external carrier, said catalyst comprising:
  (i) a symmetrical complex of formula (I):

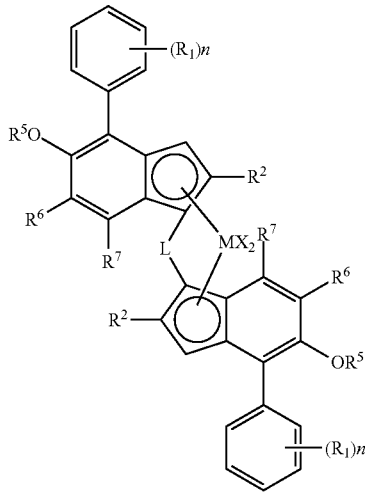

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;
$R^2$ is a C1-C20 hydrocarbyl radical;
$R^5$ is a C1-C20 hydrocarbyl radical;
$R^6$ is a tertiary C4-C20 hydrocarbyl radical;
$R^7$ is a hydrogen atom or a $C_{1-10}$-hydrocarbyl radical;
n is 0 to 3;
$R^1$ is a C1-C20 hydrocarbyl radical and optionally two adjacent $R^1$ groups taken together can form a further mono or multicyclic ring condensed to Ph ring optionally substituted by one or two groups $R^4$; and
$R^4$ is a C1-C10 alkyl radical
and (ii) a cocatalyst; and (II) in a second subsequent stage polymerising propylene and ethylene in the gas phase in the presence of the product of step (I) and in the presence of the catalyst from step (I) to produce said heterophasic copolymer of propylene and ethylene;

wherein the xylene soluble fraction (XS) of the heterophasic copolymer of propylene and ethylene has an intrinsic viscosity of at least 1.5 dl/g and an ethylene content of 10 to 70 wt %; and wherein the xylene soluble fraction (XS) is at least 15 wt % of the heterophasic copolymer of propylene and ethylene.

2. A process as claimed in claim 1 wherein the catalyst is formed by obtaining a complex of formula (I) and a cocatalyst;

forming a liquid/liquid emulsion system, which comprises a solution of catalyst components (i) and (ii) dispersed in a solvent, and solidifying said dispersed droplets to form solid particles.

3. A process as claimed in claim 1 wherein step (I) produces a propylene homopolymer.

4. A process as claimed in claim 1 wherein all polymerisation steps of the process other than any prepolymerisation step take place at a temperature of at least 60° C.

5. A process as claimed in claim 1 wherein the ethylene content of the xylene soluble fraction of the heterophasic copolymer of propylene and ethylene is at least 14 wt %.

6. A process as claimed claim 1 wherein $R^2$ is branched 13 to the cyclopentadienyl ring.

7. A process as claimed in claim 1 wherein the complex is of formula (II)

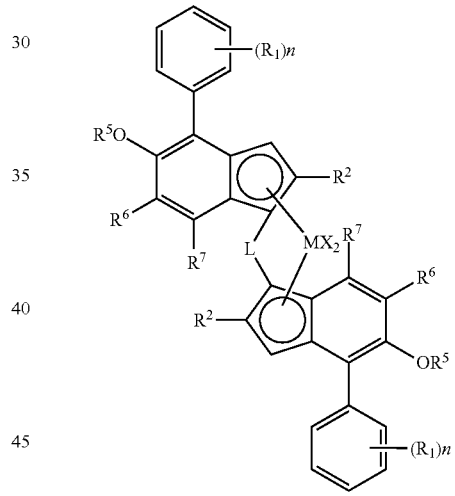

wherein
M is Zr or Hf;
$R^2$ is CH$_2$-Ph, CH$_2$—C(R$^3$)$_{3-q}$(H)$_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;
L is methylene, ethylene or SiR$^8_2$;
$R^8$ is C1-10 alkyl, $C_{6-10}$-aryl, $C_{7-12}$-alkylaryl, or $C_{7-12}$-arylalkyl;
each X is a hydrogen atom, benzyl, OR, a halogen atom, or an R group;
R is $C_{1-10}$ alkyl or $C_{6-10}$ aryl;
each $R^7$ is H or $C_{1-3}$-alkyl;
n is 0 to 2;
$R^1$ is $C_{1-10}$-alkyl;
$R^5$ is $C_{1-10}$ alkyl; and
$R^6$ is tertiary $C_{4-10}$-alkyl;
and wherein the two ligands forming the complex are identical.

8. A process as claimed in claim 1 wherein the complex is of formula (III)

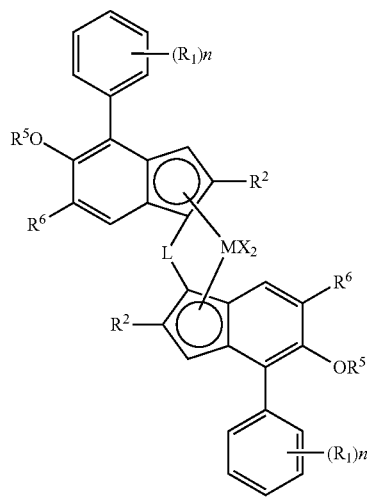

(III)

in which:
M is Zr or Hf
each $R^2$ is $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;
L is $SiR^8_2$;
$R^8$ is $C_{1-8}$ alkyl;
each X is a halogen atom, methoxy, benzyl or methyl;
n is 0 or 1;
$R^5$ is $C_{1-6}$ alkyl;
$R^6$ is tertiary $C_{4-10}$ alkyl; and
$R^1$ is $C_{1-6}$ alkyl;
and wherein the two ligands forming the complex are identical.

9. A process as claimed in claim 1 wherein the complex is of formula (IV)

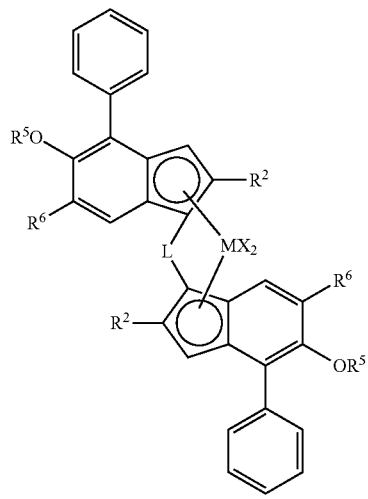

(IV)

wherein L is $SiR^8_2$;
$R^8$ is $C_{1-8}$ alkyl;
$R^2$ is $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;
each X is a halogen atom, methoxy, benzyl or methyl;
M is Zr; or Hf;
$R^5$ is $C_{1-6}$ alkyl; and
$R^6$ is tertiary $C_{4-10}$ alkyl;
and wherein the two ligands forming the complex are identical.

10. A process as claimed in claim 1 wherein the complex is of formula (V)

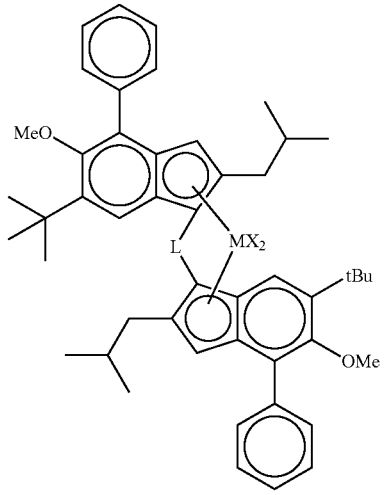

(V)

wherein L is $SiR^8_2$;
$R^8$ is $C_{1-8}$ alkyl;
each X is a halogen atom, methoxy, benzyl or methyl; and
M is Zr.

11. A process as claimed in claim 1 wherein the XS fraction of the heterophasic copolymer of propylene and ethylene is at least 20 wt-%.

12. A process as claimed in claim 1 wherein the cocatalyst comprises an organometallic compound of a Group 13 metal.

13. A process as claimed in claim 1 wherein the complex is

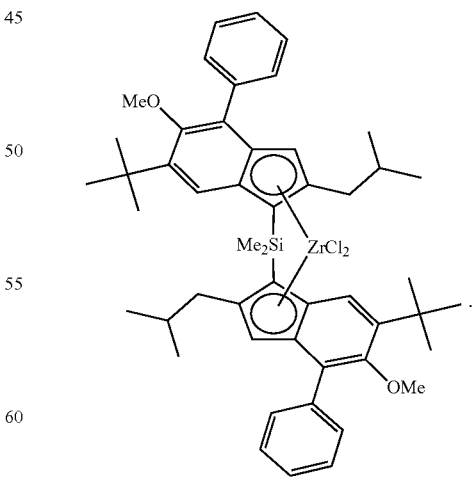

* * * * *